United States Patent
Singh et al.

(10) Patent No.: US 6,444,779 B1
(45) Date of Patent: *Sep. 3, 2002

(54) METHOD OF PREPARING A POLY(ARYLENE ETHER), AND A POLY(ARYLENE ETHER) PREPARED THEREBY

(75) Inventors: Probjot Singh, Delmar, NY (US); Hugo Gerard Eduard Ingelbrecht, Essen (BE); David Parrillo, Schenectady; Mukund Parthasarathy, Delmar, both of NY (US)

(73) Assignee: General Electric Company, Pittsfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/683,806

(22) Filed: Feb. 19, 2002

Related U.S. Application Data

(63) Continuation of application No. 09/681,895, filed on Jun. 21, 2001.

(51) Int. Cl.⁷ .......................... C08G 65/38; C08G 65/44
(52) U.S. Cl. ....................... 528/217; 528/212; 528/214; 528/502 R; 528/503; 425/74
(58) Field of Search ................................ 528/217, 212, 528/214, 502 R, 503; 425/74

(56) References Cited

U.S. PATENT DOCUMENTS

| | | | |
|---|---|---|---|
| 3,257,357 A | 6/1966 | Stamatoff |
| 3,257,358 A | 6/1966 | Stamatoff |
| 3,306,874 A | 2/1967 | Hay |
| 3,306,875 A | 2/1967 | Hay |
| 3,337,501 A | 8/1967 | Bussink et al. |
| 3,681,285 A | 8/1972 | Naarmann et al. |
| 3,749,693 A | 7/1973 | Cooper |
| 3,787,361 A | 1/1974 | Nakashio et al. |
| 3,789,054 A | 1/1974 | Izawa et al. |
| 3,838,102 A | 9/1974 | Bennett et al. |
| 4,011,200 A | 3/1977 | Yonemitsu et al. |
| 4,038,343 A | 7/1977 | Yonemitsu et al. |
| 4,067,851 A | 1/1978 | Tomita et al. |
| 4,211,857 A | 7/1980 | Sugio et al. |
| 4,309,513 A | 1/1982 | Ueno et al. |
| 4,341,879 A | 7/1982 | Sugio et al. |
| 4,368,293 A | 1/1983 | Yamashita et al. |
| 4,383,066 A | 5/1983 | Sugio et al. |
| 4,389,516 A | 6/1983 | Sugio et al. |
| 4,436,870 A | 3/1984 | Hinselmann et al. |
| 4,463,164 A | 7/1984 | Dalton et al. |
| 4,485,219 A | 11/1984 | Falk et al. |
| 4,491,649 A | 1/1985 | Falk et al. |

(List continued on next page.)

FOREIGN PATENT DOCUMENTS

| | | |
|---|---|---|
| EP | 0 153 074 A2 | 2/1985 |
| EP | 0 627 466 A2 | 5/1994 |
| EP | 1 167 421 A2 | 6/2001 |

OTHER PUBLICATIONS the claims of co-pending application Ser. No-09/681,895.*
Derwent Abstracts Record for JP 62-158720 (Asahi), published Jul. 14, 1987.
Derwent Abstracts Record for JP 62-181333 A (Asahi), published Aug. 8, 1987.
Derwent Abstracts Record for JP 63-304025 A (Asahi), published Dec. 12, 1989.

*Primary Examiner*—Duc Truong

(57) ABSTRACT

A method of preparing a poly(arylene ether) includes oxidatively polymerizing a monohydric phenol in solution, concentrating the solution by removing a portion of the solvent to form a concentrated solution having a cloud point, $T_{cloud}$, adjusting the temperature of the concentrated solution to at least about ($T_{cloud}-10°$ C.), and combining the concentrated solution with an anti-solvent to precipitate the poly (arylene ether). The method reduces the formation of undesirably fine particles in the product poly(arylene ether).

43 Claims, 1 Drawing Sheet

U.S. PATENT DOCUMENTS

| | | |
|---|---|---|
| 4,503,186 A | 3/1985 | Sugio et al. |
| 4,543,391 A | 9/1985 | Kuribayashi et al. |
| 4,556,685 A | 12/1985 | Sugio et al. |
| 4,556,699 A | 12/1985 | Bialy et al. |
| 4,590,239 A | 5/1986 | Sugio et al. |
| 4,603,194 A | 7/1986 | Mendiratta et al. |
| 4,617,372 A | 10/1986 | Yano et al. |
| 4,634,761 A | 1/1987 | Mendiratta et al. |
| 4,654,405 A | 3/1987 | Jalbert et al. |
| 4,692,482 A | 9/1987 | Lohrengel |
| 4,695,601 A | 9/1987 | Halpern |
| 4,742,115 A | 5/1988 | Mawatari et al. |
| 4,798,865 A | 1/1989 | Grant et al. |
| 4,906,700 A | 3/1990 | Banevicius |
| 4,914,153 A | 4/1990 | Togo et al. |
| 4,923,924 A | 5/1990 | Grant et al. |
| 5,086,112 A | 2/1992 | Togo et al. |
| 5,175,211 A | 12/1992 | Sanada et al. |
| 5,306,807 A | 4/1994 | Kailasam et al. |
| 5,977,240 A | 11/1999 | Lohmeijer et al. |
| 6,211,327 B1 | 4/2001 | Braat et al. |
| 2002/0010314 A1 | 1/2002 | Mitsui et al. |
| 2002/0013446 A1 | 1/2002 | Mitsui et al. |

* cited by examiner

METHOD OF PREPARING A POLY (ARYLENE ETHER), AND A POLY(ARYLENE ETHER) PREPARED THEREBY

CROSS REFERENCE TO RELATED APPLICATIONS

This application is a continuation of U.S. application Ser. No. 09/681895, filed Jun. 21, 2001, now U.S. Pat. No. 6,407,200.

BACKGROUND OF THE INVENTION

Poly(arylene ether) resins are well known and widely used thermoplastics valued for properties including heat resistance, stiffness, and high impact strength. Various methods of preparing poly(arylene ether) homopolymers and copolymers are known, and these materials are often isolated and handled as powders.

U.S. Pat. No. 3,306,875 to Hay generally describes oxidation of phenols to polyphenylene ethers and diphenoquinones. Poly(arylene ether)s prepared include homopolymers of 2,6-dimethylphenol and a copolymer of 2,6-dimethylphenol and 2,6-diethylphenol. Poly(arylene ether)s were typically isolated by combining the polymerization reaction mixture with an anti-solvent, such as methanol, and filtering the resulting precipitate.

U.S. Pat. No. 4,011,200 to Yonemitsu et al. generally describes copolymers comprising 50–98 mole percent of 2,6-dimethylphenol monomer units and 50–2 mole percent 2,3,6-trimethylphenol monomer units. Product poly(arylene ether)s were typically isolated by precipitation and filtration.

U.S. Pat. No. 4,603,1 94 to Mendiratta et al. generally describes a method of isolating polymer resins, including poly(arylene ether)s, from organic solvents. The method comprises volatilizing the organic solvent in the presence of an aqueous slurry of solid polymer particles of a particular size that provides agglomeration sites for the polymer resin within the solution.

U.S. Pat. No. 4,634,761 to Mendiratta et al. generally describes a continuous process for isolating polymer resins, including poly(arylene ether)s, from organic solvents. The process comprises volatilizing the organic solvents in an aqueous solution to form polymer granules, and controlling the size of the granules by interrupting the feed of the organic solvent solution.

U.S. Pat. No. 4,906,700 to Banevicius generally describes a process for reduction of odoriferous poly(arylene ether) by-products, such as 2,3,6-trimethylanisole, by continuously distilling and recycling the aromatic hydrocarbon solvent used in the poly(arylene ether) polymerization. The poly (arylene ether) preparation method described includes a pre-concentration step.

U.S. Pat. No. 6,211,327 B1 to Braat et al. generally describes a process for producing poly(arylene ether) resins having intrinsic viscosities of about 0.08–0.16 deciliters/gram (dL/g) in chloroform at 25° C. The poly(arylene ether)s were directly isolated by solvent devolatilization.

European Patent Application No. 153,074 A2 to Kawaki et al. generally describes a process for producing a poly (arylene ether) employing a catalyst composed of a cuprous salt and a primary or secondary amine in a mixed solvent consisting of 1 part by weight of a good solvent for the resulting poly(arylene ether) and 0.9 to 1.1 part by weight of a poor solvent for the resulting poly(arylene ether). The poly(arylene ether) is described as precipitating during the polymerization, and it is isolated by filtration and washing.

European Patent Application 627,466 A2 to Campbell et al. generally describes immiscible polymer blends comprising poly(arylene ether)s having high glass transition temperatures. Example 1 describes the preparation of a poly (arylene ether) copolymer of 2,6-dimethylphenol and 2,3,6-trimethylphenol; the copolymer was isolated by reverse precipitation with acetone and filtration.

Although some of the above methods enable high yields and productivities, the poly(arylene ether) powders they produce may include undesirably high proportions of fines, which are herein defined as solid particles having a particle size less than about 38 micrometers. It is desirable to reduce fines, in that their presence may be associated with losses of the poly(arylene ether) during filtration and drying stages. Other methods may allow the isolation of powders having low content of fines, but they are not readily and economically adaptable to a large-scale manufacturing facility. There remains a need for an economical poly(arylene ether) preparation method that produces poly(arylene ether) powders having a reduced content of fines.

SUMMARY OF THE INVENTION

The above-described and other drawbacks and disadvantages of the prior art are alleviated by a method of preparing a poly(arylene ether), comprising: oxidatively coupling a monohydric phenol using an oxygen-containing gas in the presence of a solvent and a complex metal catalyst to produce a poly(arylene ether) resin; removing a portion of the solvent to produce a concentrated solution having a cloud point, $T_{cloud}$; and combining the concentrated solution with an anti-solvent to precipitate the poly(arylene ether), wherein the concentrated solution has a temperature of at least about ($T_{cloud}$–10° C.) immediately before it is combined with the anti-solvent.

In another embodiment, a method of preparing a poly (arylene ether) comprises: oxidatively coupling 2,6-dimethylphenol and 2,3,6-trimethylphenol using an oxygen-containing gas in the presence of toluene and a complex copper catalyst to produce a poly(arylene ether) copolymer resin; removing a portion of the solvent to produce a concentrated solution having a cloud point, $T_{cloud}$; and combining the concentrated solution with an anti-solvent to precipitate the poly(arylene ether); wherein the concentrated solution has a temperature, T, immediately before it is combined with the anti-solvent; and wherein T satisfies the inequality $$T > \left( \frac{\phi_s - (0.296 \times IV + 1.27 \times TMP - 35.7)}{1.97(1 - 0.00795 \times IV - 0.0249 \times TMP)} - 10 \right)$$

where $\phi_S$ is the polymer concentration (expressed in weight percent), $T_{cloud}$ is the cloud point of the system (expressed in ° C), IV is the intrinsic viscosity of the copolymer in chloroform at 25° C. (expressed in mL/g), and TMP is the 2,3,6-trimethylphenol content of the copolymer (expressed in weight %).

Other embodiments, including poly(arylene ether) resins prepared according to the methods, are described below.

DETAILED DESCRIPTION

Figure 1:
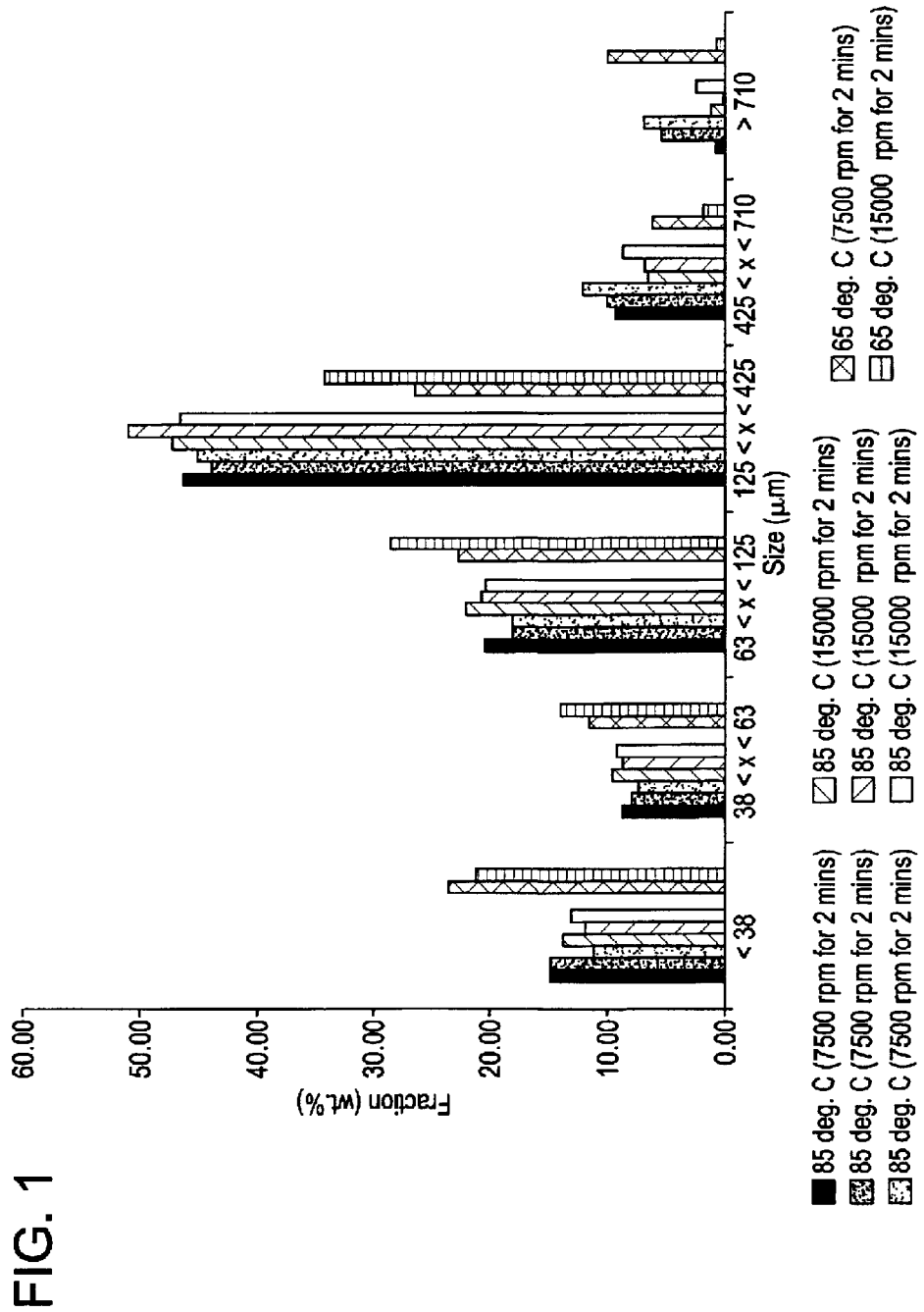
FIG. 1 is bar chart showing particle size distribution of a poly(arylene ether) as a function of pre-concentration temperature and high-shear precipitator rotation rate.

One embodiment is a method of preparing a poly(arylene ether), comprising: oxidatively coupling a monohydric phenol using an oxygen-containing gas in the presence of a solvent and a complex metal catalyst to produce a poly (arylene ether) resin; removing a portion of the solvent to produce a concentrated solution having a cloud point, $T_{cloud}$; and combining the concentrated solution with an anti-solvent to precipitate the poly(arylene ether), wherein the concentrated solution has a temperature of at least about ($T_{cloud}$–10° C.) immediately before it is combined with the anti-solvent.

There is no particular limitation on the monohydric phenol used in the poly (arylene ether) synthesis. Suitable monohydric phenols include those having the formula:

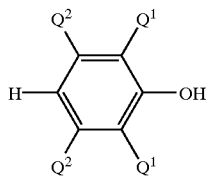

wherein each $Q^1$ is independently halogen, $C_1$–$C_7$ primary or secondary alkyl, phenyl, $C_1$–$C_7$ haloalkyl, $C_1$–$C_7$ aminoalkyl, $C_1$–$C_7$ hydrocarbonoxy, $C_2$–$C_7$ halohydrocarbonoxy wherein at least two carbon atoms separate the halogen and oxygen atoms, or the like; and each $Q^2$ is independently hydrogen, halogen, $C_1$–$C_7$ primary or secondary alkyl, phenyl, $C_1$–$C_7$ haloalkyl, $C_1$–$C_7$ hydrocarbonoxy, $C_2$–$C_7$ halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen or methyl.

In a preferred embodiment, the monohydric phenol comprises 2,6-dimethylphenol (hereinafter "DMP") and 2,3,6-trimethylphenol (hereinafter "TMP"). In this embodiment, the DMP and TMP may be used in any proportion, from weight ratios of 99:1 to 1:99. However, it may be preferred to use a DMP:TMP weight ratio of about 1:1 to about 20:1.

The oxidative coupling of the monohydric phenol uses an oxygen-containing gas, which is typically oxygen ($O_2$) or air, with oxygen being preferred.

The monohydric phenol is oxidatively coupled in the presence of a solvent and a complex metal catalyst. Suitable organic solvents include aliphatic alcohols, ketones, aliphatic and aromatic hydrocarbons, chlorohydrocarbons, nitrohydrocarbons, ethers, esters, amides, mixed ether-esters, sulfoxides, and the like, and combinations comprising at least one of the foregoing organic solvents, providing they do not interfere with or enter into the oxidation reaction. In a preferred embodiment, the solvent comprises a $C_6$–$C_{18}$ aromatic hydrocarbon, including, for example, toluene, xylenes, and the like, and mixtures thereof. A highly preferred solvent is toluene.

The solvent may comprise, in addition to a $C_6$–$C_{18}$ aromatic hydrocarbon, a $C_3$–$C_8$ aliphatic alcohol that is a poor solvent for the poly(arylene ether), such as, for example, n-propanol, isopropanol, n-butanol, t-butanol, n-pentanol, and the like, and combinations comprising at least one of the foregoing $C_3$–$C_8$ aliphatic alcohols. A preferred $C_3$–$C_8$ aliphatic alcohol is n-butanol. The solvent may further comprise, in addition to a $C_6$–$C_{18}$ aromatic hydrocarbon and a $C_3$–$C_8$ aliphatic alcohol, methanol or ethanol, which act as an anti-solvent for the poly(arylene ether). The $C_6$–$C_{18}$ aromatic hydrocarbon, the $C_3$–$C_8$ aliphatic alcohol, and the methanol or ethanol may be combined in any proportion, but it may be preferred that the solvent comprise at least about 50 weight percent of the $C_6$–$C_{18}$ aromatic hydrocarbon.

The complex metal catalyst may comprise a metal ion. Preferred metal ions include ions from Group VIB, VIIB, or IB of the periodic table, and combinations thereof. Of these, ions of chromium, manganese, cobalt, copper, and combinations comprising at least one of the foregoing ions may be preferred, with copper ions ($Cu^+$ and $Cu^{++}$) being highly preferred.

The complex metal catalyst may further comprise a nitrogen-containing ligand. The nitrogen-containing ligand may include, for example, alkylenediamine ligands, primary monoamines, secondary monoamines, tertiary monoamines, aminoalcohols, oxines, combinations comprising at least one of the foregoing nitrogen-containing ligands, or the like.

Suitable alkylenediamine ligands include those having the formula

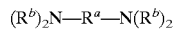

wherein $R^a$ is a substituted or unsubstituted divalent residue wherein two or three aliphatic carbon atoms form the closest link between the two diamine nitrogen atoms; and each $R^b$ is independently hydrogen or $C_1$–$C_8$ alkyl. Preferred alkylenediamine ligands include those in which $R^a$ is ethylene (—$CH_2CH_2$—) or trimethylene (—$CH_2CH_2CH_2$—), and each $R^b$ is independently hydrogen, isopropyl, or a $C_4$–$C_8$ alpha-tertiary alkyl group. Highly preferred alkylenediamine ligands include N,N -di-t-butylethylenediamine and N,N,N',N'-tetramethyl-1,3-diaminopropane.

Suitable primary monoamines include $C_3$–$C_{12}$ primary alkylamines, such as, for example, n-propylamine, i-propylamine, n-butylamine, sec-butylamine, t-butylamine, n-penylamine, n-hexylamine, cyclohexylamine, combinations comprising at least one of the foregoing primary monoamines, and the like. A highly preferred primary monoamine is n-butylamine.

Suitable secondary monoamines include secondary monoamines having the structure $(R^c)(R^d)NH$, wherein $R^c$ and $R^d$ are each independently a $C_1$–$C_{11}$ alkyl group, with the proviso that $R^c$ and $R^d$ collectively have a total of four to twelve carbon atoms. Examples of secondary monoamines include di-n-propylamine, n-propyl-n-butylamine, di-n-butylamine, d-t-butylamine, n-butyl-n-penylamine, di-n-hexylamine, and the like, with di-n-butylamine being preferred.

Suitable tertiary monoamines include tertiary monoamines having the structure $(R^e)(R^f)(R^g)N$, wherein $R^e$ and $R^f$ and $R^g$ are each independently a $C_1$–$C_{16}$ alkyl group, with the proviso that $R^e$ and $R^f$ and $R^g$ collectively have a total of four to eighteen carbon atoms. Examples of tertiary monoamines include triethylamine, tri-n-propylamine, tri-n-butylamine, dimethyl-n-butylamine, dimethyl-n-penylamine, diethyl-n-butylamine, triycyclohexylamine, and the like. In addition, cyclic tertiary amines, such as pyridine, alpha-collidine, gamma-picoline, and the like, can be used. Highly preferred tertiary monoamines include dimethyl-n-butylamine. Additional primary, secondary, and tertiary amines are described in U.S. Pat. Nos. 3,306,874 and 3,306,875 to Hay.

Suitable aminoalcohols include $C_4$–$C_{12}$ aminoalcohols having one nitrogen atom and an alcohol oxygen, wherein at least two carbon atoms separate the amino nitrogen and the alcohol oxygen. Examples of aminoalcohols include N,N-diethylethanolamine, 4-butanolamine, N-methyl-4-butanolamine, diethanolamine, triethanolamine, N-phenylethanolamine, and the like, and combinations comprising at least one of the foregoing aminoalcohols. Highly preferred aminoalcohols include triethanolamine and N-phenylkethanolamine.

Suitable oxines include those having the formula

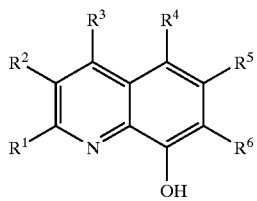

wherein $R^1$–$R^6$ are each independently hydrogen, halogen, hydroxyl, nitro, amino, $C_1$–$C_6$ alkyl, or $C_1$–$C_6$ alkoxyl. Examples of oxines include oxine, 5-methyloxine, 5-hydroxyoxine, 5-nitroxine, 5-aminoxine, 2-methyloxine, and the like, and combinations comprising at least one of the foregoing oxines. Highly preferred oxines include oxine and 5-methyloxine.

The alkylenediamine ligands, primary monoamines, secondary monoamines, aminoalcohols, and oxines, when present, may be used at about 0.01 to about 25 moles per 100 moles of monohydric phenol. The tertiary monoamines may be used at about 0.1 to about 1,500 moles per 100 moles of monohydric phenol. Selections of appropriate concentrations within these ranges may be made by those of ordinary skill in the art without undue experimentation, and selected concentrations may reflect the presence of other reaction components or products, such as water, that may affect catalyst efficiency. A suitable molar ratio of complex metal catalyst (measured as moles of metal) to phenol is about 1:50 to about 1:400, with about 1:100 to about 1:200 being preferred.

The complex metal catalyst may, optionally, further include a halide ion such as chloride, bromide, or iodide. When employed, halide ions may be supplied to the reaction mixture in the form of an alkali metal salt or an alkaline earth metal salt at a concentration of about 0.1 mole to about 150 moles per 100 moles of phenolic monomer.

In a preferred embodiment, the complex metal catalyst comprises copper ion, a secondary alkylenediamine ligand, a secondary monoamine, and a tertiary monoamine. In a highly preferred embodiment, the complex metal catalyst comprises copper ion, N,N'-di-t-butylethylenediamine, di-n-butylamine, and dimethyl-n-butylamine.

The process and reaction conditions for the polymerization, such as reaction time, temperature, oxygen flow rate, and the like may be modified based on the target molecular weight and monomer composition. The endpoint of the polymerization may conveniently be determined with an in-line viscosity meter. Other methods such as making molecular weight measurements, running to a predetermined reaction time, controlling to a specified end group concentration, or the oxygen concentration in solution may also be utilized.

The temperature to carry out the polymerization stage is generally about 0° C. to about 95° C. Within this range, it may be preferred to use a temperature of at least about 35° C. Also within this range, it may be preferred to use a temperature up to 45° C. At temperatures substantially higher than about 95° C., side reactions can occur leading to reaction by-products, and at temperatures substantially lower than about 0° C., ice crystals may form in the solution.

The method may, optionally, further comprise recovering the complex metal catalyst with an aqueous solution. Many diverse extractants or chelating agents may be used to complex with the catalyst after the end of the polymerization reaction. For example, sulfuric acid, acetic acid, ammonium salts, bisulfate salts and various chelating agents may be used. When these materials are added to a poly(arylene ether) reaction solution, the complex metal catalyst becomes poisoned and further oxidation does not take place. Many different materials may be used but it is preferred to employ those chelating agents that are disclosed in U.S. Pat. No. 3,838,102 to Bennett et al. Useful chelating agents include polyfunctional carboxylic acid containing compounds, such as, for example, polyalkylenepolyamine polycarboxylic acids, aminopolycarboxylic acids, aminocarboxylic acids, aminopolycarboxylic acids, aminocarboxylic acids, polycarboxylic acids and their alkali metal, alkaline earth metal or mixed alkali metal-alkaline earth metal salts. Specific examples of chelating agents include, for example, sodium potassium tartrate, nitrilotriacetic acid (NTA), citric acid, glycine, ethylenediaminetetraacetic acid (EDTA), hydroxyethylenediaminetriacetic acid, diethylenetriaminepentaacetic acid, salts of the foregoing chelating agents, combinations comprising at least one of the foregoing chelating agents, and the like. Especially preferred chelating agents include ethylenediaminetetraacetic acid or a mono-, di-, tri- and tetrasodium salt thereof. The resulting copper complex can be referred to as a copper carboxylate complex.

The chelated metallic catalyst component may be extracted with the water produced in the polymerization reaction through the use of a liquid/liquid centrifuge. Alternatively, additional water may be added to the mixture to improve the mixing and extraction efficiency. In either case, the chelated metallic catalyst component dissolved in the water phase may be separated from the poly(arylene ether)/toluene solution by the use of a liquid/liquid centrifuge. The preferred extraction liquid is an aqueous solution of lower alkanol, for example, a mixture of water and an alkanol having from 1 to about 4 carbon atoms. Generally from about 1% to about 80% by volume of the alkanol may be employed, based on the total volume of the aqueous solution of lower alkanol. The volume ratio of the aqueous liquid extractant to discrete organic phase may vary from about 0.01:1 to about 10:1.

The reaction medium may comprise an aqueous environment. Anti-solvents can also be utilized in combination with the aqueous media to help drive the precipitation of the copper (I) species. The selection of an appropriate anti-solvent is based partially on the solubility coefficient of the copper (I) species that is being precipitated. The halides are highly insoluble in water, $\log(K_{sp})$ values at 25° C. are −4.49, −8.23, and −11.96 for CuCl, CuBr, and CuI, respectively. Solubility in water is increased by the presence of excess of halide ions due to the formation of, e.g., $CuCl_2^-$, $CuCl_3^{2-}$, and $CuCl_4^{3-}$, and by other complexing species. Examples of anti-solvents include low molecular weight aliphatic and aromatic hydrocarbons, ketones, alcohols, and the like, which in themselves would have some solubility in the aqueous solution. One skilled in the art would be able to select an appropriate type and amount of anti-solvent, if any was utilized.

The method comprises removing a portion of the solvent to produce a concentrated solution having a cloud point, $T_{cloud}$. ($T_{cloud}$ and its determination are discussed in detail below.) This concentration step, sometimes referred to as pre-concentration, may, for example, be conducted after removal of the complex metal catalyst. The pre-concentration step may preferably produce a concentrated solution having about 20 to about 60 weight percent of the poly(arylene ether). Determining the desired poly(arylene ether) weight percent will depend on the solvent, as well as the monomer composition and intrinsic viscosity of the poly(arylene ether). Within this range, it may be preferred to have a poly(arylene ether) concentration of at least about 25 weight percent, yet more preferably at least about 30 weight percent. Also within the above range, it may be preferred to have a poly(arylene ether) concentration of up to about 55 weight percent, more preferably up to about 50 weight percent, yet more preferably up to about 45 weight percent. In a preferred embodiment, the removing a portion of the solvent to produce a concentrated solution may be conducted at a temperature of at least about ($T_{cloud}$−10° C.), more preferably at least about ($T_{cloud}$−5° C.), yet more preferably at least about $T_{cloud}$, even more preferably at least about ($T_{cloud}$+5° C.), still more preferably at least about ($T_{cloud}$+10° C.).

Any suitable method for pre-concentration may be employed. For example, the pre-concentration may be carried out by preheating the solution above its atmospheric boiling point at a pressure modestly elevated above one atmosphere (so that no boiling takes place in the heat exchanger) followed by flashing the solution to a lower pressure and temperature, whereby vaporization of a substantial part of the solvent takes place and the required heat of vaporization is supplied by the heat transferred in the heat exchanger as sensible heat of the solution.

The method further comprises combining the concentrated solution with an anti-solvent to precipitate the poly (arylene ether), wherein the concentrated solution has a temperature of at least about ($T_{cloud}$−10° C.) immediately before it is combined with the anti-solvent. Through extensive experimentation, the present inventors found that while conventional processes for poly(arylene ether) synthesis and isolation may lead to unacceptably high levels of fines, reduced levels of fines are obtained when the concentrated solution has a temperature of at least about ($T_{cloud}$−10° C.) immediately before it is combined with the anti-solvent. The cloud point, $T_{cloud}$, is a property of the concentrated solution resulting from the pre-concentration step. It corresponds to the temperature at which turbidity is first observed for a cooling solution of a poly(arylene ether), and it is influenced by factors including the poly (arylene ether)'s monomer composition and intrinsic viscosity and concentration, as well as the identity of the solvent. A detailed procedure for determining a cloud point is provided below in Examples 2–26. For a given poly(arylene ether) dissolved in a given solvent, the $T_{cloud}$ value may be determined by preparing the solution in its homogeneous state and gradually decreasing the temperature until turbidity is first observed. By measuring $T_{cloud}$ for variations in poly(arylene ether) monomer composition, intrinsic viscosity, and concentration, it is possible to derive an equation relating $T_{cloud}$ to these variables for any poly(arylene ether)/solvent system.

While it has been found that poly(arylene ether) powders having acceptably low fines contents may be produced by precipitation when a concentrated solution having a temperature of at least ($T_{cloud}$−10° C.) is combined with an anti-solvent, it may be preferable to further reduce fines content by using a concentrate temperature of at least about ($T_{cloud}$−5° C.), more preferably at least about ($T_{cloud}$), yet more preferably at least about ($T_{cloud}$+5° C.), and even more preferably at least about ($T_{cloud}$+10° C.).

By specifying the temperature of the concentrated solution "immediately before" it is combined with the anti-solvent, it is meant that the concentrated solution has the specified temperature as it is combined with the anti-solvent. As a practical matter, the temperature of the concentrated solution may be determined at any time within about 30 seconds of mixing with the anti-solvent. Another way of expressing the temperature limitation is to say that the process comprises removing a portion of the solvent to produce a concentrated solution having a cloud point, $T_{cloud}$; adjusting the temperature of the concentrated solution to at least about ($T_{cloud}$−10° C.); and combining the concentrated solution with an anti-solvent to precipitate the poly (arylene ether).

In one embodiment, the concentrated solution has a temperature greater than $T_{cloud}$ and is homogeneous immediately before it is mixed with the anti-solvent. Homogeneity of the solution corresponds to the absence of any turbidity in the solution and may be determined using the same visual observation techniques employed for $T_{cloud}$ determination. In a highly preferred embodiment, a temperature of at least about ($T_{cloud}$+5° C.) is maintained in the poly (arylene ether)-containing solution from the beginning of the concentration step to the moment immediately before the resulting concentrated solution is combined with anti-solvent.

In one embodiment, $T_{cloud}$ is at least about 60° C., preferably at least about 70° C., more preferably at least about 80° C., yet more preferably at least about 90° C. It should be noted that solutions of the homopolymer poly(2,6-dimethyl-1,4-phenylene ether) in aromatic solvents such as toluene typically do not exhibit a cloud point. Rather, as such solutions of poly(2,6-dimethyl-1,4-phenylene ether) are concentrated, they may form a gelatinous phase without the discrete solid particles characteristic of a cloud point.

Suitable anti-solvents include lower alkanols having one to about ten carbon atoms, such as methanol, and the like; ketones having three to about ten carbon atoms, such as acetone, and the like; and alkanes having five to about ten carbon atoms, such as hexane; and the like; and combinations comprising at least one of the foregoing anti-solvents. A preferred anti-solvent comprises methanol. A highly preferred anti-solvent comprises about 70 to 100 weight percent methanol, 0 to about 20 weight percent toluene, and 0 to about 10 weight percent water. The anti-solvent may be employed at a range of amounts relative to the amount of the organic solvent, with the optimum amount depending on the identities of the organic solvent and anti-solvent, as well as the concentration, intrinsic viscosity, and monomer composition of the poly(arylene ether) product. For example, when the poly(arylene ether) is a random copolymer having an intrinsic viscosity of 0.36 dL/g and a composition of 82 weight percent 2,6-dimethyl-1,4-phenylene ether units and 18 weight percent 2,3,6-dimethyl-1,4-phenylene ether units, the organic solvent is toluene, and the anti-solvent is methanol, a toluene:methanol weight ratio of about 1:1.5 to about 1:5 may be suitable.

While there is no particular limitation on the temperature of the anti-solvent solution before it is combined with the concentrated solution, it may be preferred to select an anti-solvent temperature so that combining the concentrated solution with the anti-solvent produces a mixture having a temperature of about 20° C. to about 50° C. Within this range, it may be preferable to use a mixture temperature of at least about 25° C., more preferably at least about 35° C. Also within this range, it may be preferable to use a mixture temperature up to about 45° C.

There is no particular limitation on the apparatus used to perform the precipitation. The precipitation may be conducted, for example, in a stirred tank vessel or a high-shear impeller. Suitable high shear impellers are commercially available from, for example, Wilhelm Siefer GmbH & Co., Velbert, Germany. The shear rates during precipitation in the stirred tank and in the high shear homogenizer may be about 500 sec$^{-1}$ to 50,000 sec$^{-1}$.

The method may, optionally, further comprise isolation of the precipitated poly (arylene ether) using any conventional filtration or solid/liquid separation technique. Suitable filtration apparatuses include rotating filters, continuous rotary vacuum filters, continuous moving bed filters, batch filters, and the like. Suitable solid/liquid separation apparatuses include continuous solid/liquid centrifuges.

The method may, optionally, further comprise washing of the filtered poly(arylene ether). Washing may be performed, for example, with additional anti-solvent directly on the filter or by mixing the "powder wetcake" from the filter or solid/liquid separation apparatus with additional anti-solvent in a stirred tank. A preferred method of washing the filtered poly(arylene ether) uses a two-stage reslurry and solid/liquid separation process scheme. In this embodiment, the wetcake from the filter may be washed with anti-solvent in a stirred tank; the poly(arylene ether)/solvent/anti-solvent mixture may then be separated in a solid/liquid continuous centrifuge and the poly(arylene ether) wetcake from the centrifuge may be mixed a second time with anti-solvent in a continuous stirred tank, followed by a second solid/liquid separation in a second solid/liquid centrifuge.

It may be preferred that the precipitated poly(arylene ether) comprises up to about 20 weight percent, more preferably up to about 15 weight percent, of particles smaller than 38 micrometers.

There is no particular limitation on the intrinsic viscosity of the poly(arylene ether) formed by the method. For some applications, it may be preferred to use a poly (arylene ether) having an intrinsic viscosity of at least about 0.20 dL/g, more preferably at least about 0.25 dL/g, yet more preferably at least about 0.30 dL/g, as measured in chloroform at 25° C.

In one embodiment, the method of preparing a poly (arylene ether), comprises: oxidatively coupling 2,6-dimethylphenol and 2,3,6-trimethylphenol using an oxygen-containing gas in the presence of toluene and a complex copper catalyst to produce a poly(arylene ether) copolymer resin; removing a portion of the solvent to produce a concentrated solution having a cloud point, $T_{cloud}$; and combining the concentrated solution with an anti-solvent to precipitate the poly(arylene ether); wherein the concentrated solution has a temperature, T, immediately before it is combined with the anti-solvent; and wherein T satisfies the inequality $$T > \left( \frac{\phi_s - (0.296 \times IV + 1.27 \times TMP - 35.7)}{1.97(1 - 0.00795 \times IV - 0.0249 \times TMP)} - 10 \right)$$

where $\phi_S$ is the polymer concentration (expressed in weight percent), IV is the intrinsic viscosity of the copolymer in chloroform at 25° C. (expressed in mL/g), and TMP is the 2,3,6-trimethylphenol content of the copolymer (expressed in weight %).

In another embodiment, the method of preparing a poly (arylene ether), comprises: oxidatively coupling 2,6-dimethylphenol and 2,3,6-trimethylphenol using an oxygen-containing gas in the presence of toluene and a complex copper catalyst to produce a poly(arylene ether) copolymer resin; wherein the weight ratio of 2,6-dimethylphenol to 2,3,6-trimethylphenol is about 3:1 to about 6:1; recovering the complex metal catalyst with an aqueous solution; removing a portion of the solvent to produce a concentrated solution comprising about 30 to about 45 weight percent of the poly (arylene ether) copolymer resin and having a cloud point, $T_{cloud}$; and combining the concentrated solution with an anti-solvent to precipitate the poly(arylene ether); wherein the concentrated solution has a temperature of at least about ($T_{cloud}$+5° C.) immediately before it is combined with the anti-solvent; wherein the precipitated poly (arylene ether) has an intrinsic viscosity of about 0.25 to about 0.50 dL/g; and wherein the precipitated poly(arylene ether) comprises up to about 15 weight percent of particles smaller than 38 micrometers.

In another embodiment, the method of preparing a poly (arylene ether), comprises: oxidatively coupling 2,6-dimethylphenol and 2,3,6-trimethylphenol using an oxygen-containing gas in the presence of toluene and a complex copper catalyst to produce a poly(arylene ether) copolymer resin; wherein the weight ratio of 2,6-dimethylphenol to 2,3,6-trimethylphenol is about 3:1 to about 6:1; recovering the complex metal catalyst with an aqueous solution; removing a portion of the solvent to produce a solution having about 30 to about 45 weight percent poly(arylene ether); and combining the concentrated solution with an anti-solvent to precipitate the poly (arylene ether); wherein the concentrated solution has a temperature of at least about 80° C. immediately before it is combined with the anti-solvent; wherein the precipitated poly(arylene ether) has an intrinsic viscosity of about 0.25 to about 0.40 dL/g; and wherein the precipitated poly(arylene ether) comprises up to about 15 weight percent of particles smaller than 38 micrometers.

Another embodiment is a poly(arylene ether) prepared by any of the above-described methods, especially a poly (arylene ether) comprising up to about 20 weight percent, preferably up to about 15 weight percent, of particles smaller than 38 micrometers.

The invention is further illustrated by the following non-limiting examples.

EXAMPLE 1

This example illustrates the synthesis and isolation of a poly(arylene ether) copolymer having 18 weight percent of repeating units derived from 2,3,6-trimethylphenol and 82 weight percent of units derived from 2,6-dimethylphenol. In a reactor were combined cuprous oxide ($Cu_2O$; 0.027 kg, obtained from American Chemet as purple copper) dissolved in hydrobromic acid (0.423 kg as 48% aqueous solution, CAS Reg. No.10035-10-6, obtained from Great Lakes), N,N'-di-t-butylethylenediamine (0.119 kg, DBEDA, CAS Reg. No. 4062-60-6 obtained from Celanese), di-n-butylamine (1.616 kg, DBA, CAS Reg. No. 111-92-2, obtained from Celanese), N,N-dimethylbutylamine (2.675 kg, DMBA, CAS Reg. No. 927-62-8, obtained from Celanese), a tetraalkylammonium chloride surfactant (0.059 kg, CAS Reg. No. 5137-55-3, obtained from Cognis as Aliquat), 2,6-dimethylphenol (5.361 kg) and toluene solvent (140.06 kg). Over the course of the polymerization reaction, additional 2,6-dimethylphenol (30.377 kg) was added, along with 2,3,6-trimethylphenol (7.845 kg). During the polymerization, the nitrogen flow rate was 61.3 liters/minute, the oxygen flow rate was 46.2 liters/minute, and the temperature increased gradually from 29.4° C. to 55.0° C. After the completion of the polymerization reaction, the copper catalyst was separated from the polymer by mixing the reactor effluent with an aqueous solution of nitrilotri-acetic acid (0.871 kg as a 60% solution in water, CAS Reg. No. 139-13-9, obtained from Solutia). The two phase solution was separated using a liquid-liquid centrifuge. The polymer phase was concentrated to 38 weight percent polymer by flashing toluene at atmospheric pressure. The product copolymer was precipitated from the concentrated polymer solution by combining the solution (at 88° C.) in a stirred tank vessel with methanol (at 15° C.) at 1:2 weight/ weight ratio of polymer solution:methanol. The resulting slurry was passed through a rotary vacuum filter and the wetcake was re-slurried with methanol. This slurry was centrifuged and the separated solid particles were dried in a rotary paddle dryer.

EXAMPLES 2–26

These examples illustrate the determination of cloud points for toluene solutions of poly(2,6-dimethyl-1,4-phenylene ether-co-2,3,6-trimethyl-1,4-phenylene ether) as a function of copolymer concentration, copolymer intrinsic viscosity, and copolymer composition. Copolymers having intrinsic viscosities of 35.3 mL/g to 41.6 mL/g, and 15, 18, and 21 weight percent of units derived from 2,3,6-trimethylphenol (TMP) were synthesized according to the procedure of Example 1. For a given copolymer solubility determination, an isolated poly(arylene ether) copolymer was dissolved at 10 to 30 weight percent in toluene at 90° C. The temperature of the solution was decreased at a rate of about 1° C. per minute and the temperature at which the first turbidity was observed was recorded as the cloud point, $T_{cloud}$. Results are presented in Table 1.

TABLE 1

| Ex. No. | copolymer TMP content (wt %) | I.V. (mL/g) | copolymer concentration (wt %) | observed $T_{cloud}$ (° C.) |
|---|---|---|---|---|
| 2 | 15 | 35.3 | 10 | 21.5 |
| 3 | 15 | 35.3 | 15 | 33.0 |
| 4 | 15 | 35.3 | 20 | 38.5 |
| 5 | 15 | 35.3 | 25 | 47.0 |
| 6 | 15 | 35.3 | 30 | 55.0 |
| 7 | 18 | 35.3 | 10 | 30.5 |
| 8 | 18 | 35.3 | 15 | 36.0 |
| 9 | 18 | 35.3 | 20 | 41.5 |
| 10 | 18 | 35.3 | 25 | 46.0 |
| 11 | 18 | 35.3 | 30 | 54.0 |
| 12 | 18 | 41.0 | 10 | 32.0 |
| 13 | 18 | 41.0 | 15 | 38.0 |
| 14 | 18 | 41.0 | 20 | 43.5 |
| 15 | 18 | 41.0 | 25 | 50.0 |
| 16 | 18 | 41.0 | 30 | 62.5 |
| 17 | 21 | 35.8 | 10 | 35.0 |
| 18 | 21 | 35.8 | 15 | 39.5 |
| 19 | 21 | 35.8 | 20 | 46.0 |
| 20 | 21 | 35.8 | 25 | 52.0 |
| 21 | 21 | 35.8 | 30 | 82.0 |
| 22 | 21 | 41.6 | 10 | 35.5 |
| 23 | 21 | 41.6 | 15 | 41.5 |
| 24 | 21 | 41.6 | 20 | 49.0 |
| 25 | 21 | 41.6 | 25 | 95.0 |
| 26 | 21 | 41.6 | 30 | 99.0 |

Using linear regression techniques, the data were used to generate the equation (I)

$$\phi_S = (0.30 \pm 0.15)IV + (1.27 \pm 0.31)TMP - (35.7 \pm 6.1) + (1.97 \pm 0.41)T_{cloud}(1 - (0.0080 \pm 0.0013)IV\ (0.0249 \pm 0.0026)*TMP) \quad (I)$$

where $\phi_S$ is the copolymer solubility (expressed in weight percent), IV is the copolymer intrinsic viscosity in chloroform at 25° C. (expressed in mL/g), TMP is weight percent of units derived from TMP in the copolymer (expressed in weight percent), and $T_{cloud}$ is the cloud point (expressed in ° C.). Uncertainties expressed for each coefficient and the intercept represent 95% confidence intervals. Equation (I) can be solved for $T_{cloud}$ to generate equation (II):

$$T_{cloud} = [\phi_S - (0.2961IV + 1.27TMP - 35.7)]/[1.97(1 - 0.00795IV - 0.0249TMP)] \quad (II)$$

These examples demonstrate the use of controlled variations in copolymer TMP content, intrinsic viscosity, and solution concentration to generate an equation to predict cloud point as a function of these variables. Although this example uses toluene as the solvent, the method may be applied to solutions in other solvents.

EXAMPLES 27–34

These examples demonstrate the effect of pre-concentration temperature on the generation of fines (i.e., particles smaller than 38 micrometers) in a precipitated poly(arylene ether) copolymer. The method of Example 1 was used to prepare a poly (arylene ether) random copolymer having an intrinsic viscosity of 36.4 mL/g, and 18 weight percent of repeating units derived from TMP. A sample of the isolated powder copolymer was dissolved in toluene to generate a 36 weight percent solution. The precipitation was conducted batch-wise in a stirred vessel provided with a high shear mixer, operated at high rotating speed (7,500 rpm or 15,000 rpm) to achieve high shear mixing; at the start of the experiment, the anti-solvent was present in the vessel. The anti-solvent contained 94.9 weight percent methanol, 3.1 weight percent toluene, and 2.0 weight percent water. Then the poly(arylene ether) solution in toluene—at different solids concentrations as indicated in the table below—was added within 30 seconds to the vessel in a 1:2.5 weight/weight ratio of poly(arylene ether)/toluene solution to anti-solvent. Temperature and precipitation conditions were varied for 8 samples as detailed in Table 2. The temperature of the poly(arylene ether)/toluene solution that was added to the methanol anti-solvent was either 65° C. or 85° C. Note that a 36 weight percent solution of this copolymer in toluene has a cloud point of 75° C. The temperature of the methanol was selected so that mixing of the poly(arylene ether)/toluene solution and the methanol would yield a mixture having a temperature of 40° C. This 40° C. temperature was maintained during the precipitation. The precipitated copolymer was filtered over a Schliecher and Schull "Black Ribbon" filter paper on a Buchner filter, applying vacuum; after filtration, the remaining filtercake was washed with 1,200 grams of methanol. Subsequently the washed filtercake was dried in a vacuum oven at 125° C. for about 4 hours.

For each example, the particle size distribution of the precipitated copolymer was determined using a PSD Analyzer obtained from Malvern Instruments Ltd., which employs a laser diffraction technique to sort particles into six size categories: less than 38 micrometers, 38–63 micrometers, 63–125 micrometers, 125–425 micrometers, 425–710 micrometers, and greater than 710 micrometers. The results, presented in Table 2 and FIG. 1, show that use of a preconcentration temperature of 85° C. led to the generation of fewer fines than a preconcentration temperature of 65° C.

TABLE 2

| Ex. No. | pre-conc. temp. (° C.) | precip. shear rate (rpm) | particle size distribution (wt %) | | | | | |
|---|---|---|---|---|---|---|---|---|
| | | | <38 μm | 38–63 μm | 63–125 μm | 125–425 μm | 425–710 μm | >710 μm |
| 27 | 85 | 7,500 | 14.7 | 8.5 | 20.4 | 46.3 | 9.5 | 0.6 |
| 28 | 85 | 7,500 | 14.7 | 7.9 | 18.0 | 43.9 | 10.1 | 5.3 |
| 29 | 85 | 7,500 | 11.1 | 7.3 | 17.9 | 45.1 | 11.9 | 6.7 |
| 30 | 85 | 15,000 | 13.6 | 9.4 | 22.1 | 47.4 | 6.5 | 1.1 |
| 31 | 85 | 15,000 | 12.7 | 8.8 | 20.6 | 51.3 | 6.6 | 0.1 |
| 32 | 85 | 15,000 | 13.0 | 8.9 | 20.4 | 46.7 | 8.6 | 2.4 |
| 33 | 65 | 7,500 | 23.7 | 11.6 | 22.7 | 26.2 | 6.1 | 9.8 |
| 34 | 65 | 15,000 | 21.2 | 13.9 | 28.4 | 34.2 | 1.7 | 0.6 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of preparing a poly(arylene ether), comprising:
   oxidatively coupling a monohydric phenol using an oxygen-containing gas in the presence of a solvent and a complex metal catalyst to produce a poly (arylene ether) resin;
   removing a portion of the solvent to produce a concentrated solution having a cloud point, $T_{cloud}$;
   adjusting the temperature of the concentrated solution to at least about ($T_{cloud}-10°$ C.); and
   combining the concentrated solution with an anti-solvent to precipitate the poly (arylene ether).

2. The method of claim 1, wherein the monohydric phenol comprises a monohydric phenol having the formula:

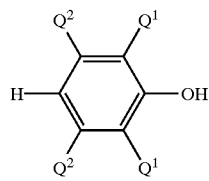

wherein each $Q^1$ is independently selected from the group consisting of halogen, $C_1$–$C_7$ primary or secondary alkyl, phenyl, $C_1$–$C_7$ haloalkyl, $C_1$–$C_7$ aminoalkyl, $C_1$–$C_7$ hydrocarbonoxy, and $C_2$–$C_7$ halohydrocarbonoxy wherein at least two carbon atoms separate the halogen and oxygen atoms; and
   each $Q^2$ is independently selected from the group consisting of hydrogen, halogen, $C_1$–$C_7$ primary or secondary alkyl, phenyl, $C_1$–$C_7$ haloalkyl, $C_1$–$C_7$ hydrocarbonoxy, and $C_2$–$C_7$ halohydrocarbonoxy wherein at least two carbon atoms separate the halogen and oxygen atoms.

3. The method of claim 1, wherein the monohydric phenol comprises 2,6-dimethylphenol and 2,3,6-trimethylphenol.

4. The method of claim 1, wherein the monohydric phenol comprises 2,6-dimethylphenol and 2,3,6-trimethylphenol in a weight ratio of about 1:1 to about 20:1.

5. The method of claim 1, wherein the solvent comprises a $C_6$–$C_{18}$ aromatic hydrocarbon.

6. The method of claim 5, wherein the solvent further comprises a $C_3$–$C_8$ aliphatic alcohol.

7. The method of claim 6, wherein the solvent further comprises methanol, ethanol, or a mixture comprising at least one of the foregoing solvents.

8. The method of claim 1, wherein the complex metal catalyst comprises a metal ion from Group VIB, Group VIIB, or Group IB of the periodic table.

9. The method of claim 1, wherein the complex metal catalyst comprises chromium, manganese, cobalt, copper, or a combination comprising at least one of the foregoing metals.

10. The method of claim 1, wherein the complex metal catalyst comprises an alkylenediamine ligand having the formula

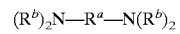

wherein $R^a$ is a substituted or unsubstituted divalent residue wherein two or three aliphatic carbon atoms form the closest link between the two diamine nitrogen atoms; and each $R^b$ is independently hydrogen or $C_1$–$C_8$ alkyl.

11. The method of claim 10, wherein each $R^a$ is ethylene or trimethylene, and each $R^b$ is independently hydrogen, isopropyl, or a $C_4$–$C_8$ alpha-tertiary alkyl group.

12. The method of claim 10, wherein the alkylenediamine ligand is N,N,N',N'-tetramethyl-1,3-diaminopropane.

13. The method of claim 10, wherein the alkylenediamine ligand is N,N'-di-t-butylethylenediamine.

14. The method of claim 1, wherein the complex metal catalyst comprises a $C_4$–$C_{12}$ secondary monoamine.

15. The method of claim 14, wherein the secondary monoamine comprises di-n-butylamine.

16. The method of claim 1, wherein the complex metal catalyst comprises a $C_4$–$C_{12}$ aminoalcohol, wherein at least two carbon atoms separate the amino nitrogen and the alcohol oxygen.

17. The method of claim 16, wherein the aminoalcohol is triethanolamine or N-phenyl-ethanolamine.

18. The method of claim 1, wherein the complex metal catalyst comprises an oxine having the formula

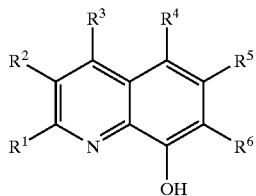

wherein $R^1$–$R^6$ are each independently selected from the group consisting of hydrogen, halogen, hydroxyl, nitro, amino, $C_1$–$C_6$ alkyl, and $C_1$–$C_6$ alkoxyl.

19. The method of claim 1, wherein the complex metal catalyst comprises a tertiary monoamine having the structure $(R^e)(R^f)(R^g)N$, wherein $R^e$ and $R^f$ and $R^g$ are each independently a $C_1$–$C_{16}$ alkyl group, with the proviso that $R^e$ and $R^f$ and $R^g$ collectively have a total of four to eighteen carbon atoms.

20. The method of claim 19, wherein the tertiary monoamine comprises dimethyl-n-butylamine.

21. The method of claim 1, wherein the complex metal catalyst comprises a $C_3$–$C_{12}$ primary alkylamine.

22. The method of claim 21, wherein the primary alkylamine is n-butylamine.

23. The method of claim 1, wherein the concentrated solution comprises about 20 to about 60 weight percent of the poly(arylene ether).

24. The method of claim 1, wherein the temperature of the concentrated solution is adjusted to at least about ($T_{cloud}$–5° C.).

25. The method of claim 1, wherein the temperature of the concentrated solution is adjusted to at least about $T_{cloud}$.

26. The method of claim 1, wherein the temperature of the concentrated solution is adjusted to at least about ($T_{cloud}$+5° C.).

27. The method of claim 1, wherein the anti-solvent comprises an anti-solvent selected from the group consisting of alkanols having one to about ten carbon atoms, ketones having three to about ten carbon atoms, alkanes having five to about ten carbon atoms, and combinations comprising at least one of the foregoing anti-solvents.

28. The method of claim 1, wherein the anti-solvent comprises methanol.

29. The method of claim 1, wherein the anti-solvent comprises about 70 to 100 weight percent methanol, 0 to about 20 weight percent toluene, and 0 to about 10 weight percent water.

30. The method of claim 1, wherein $T_{cloud}$ is at least about 60° C.

31. The method of claim 1, wherein the removing a portion of the solvent is conducted at a temperature of at least about $T_{cloud}$–10° C).

32. The method of claim 1, wherein removing a portion of the solvent is conducted at a temperature of at least about $T_{cloud}$.

33. The method of claim 1, wherein removing a portion of the solvent is conducted at a temperature of at least about ($T_{cloud}$+10° C.).

34. The method of claim 1, wherein the combining the concentrated solution with an anti-solvent is conducted using a stirred tank vessel or a high-shear impeller.

35. The method of claim 1, wherein the combining the concentrated solution with an anti-solvent produces a mixture having a temperature of about 20° C. to about 50° C.

36. The method of claim 1, wherein the precipitated poly(arylene ether) comprises up to about 20 weight percent of particles smaller than 38 micrometers.

37. The method of claim 1, wherein the precipitated poly(arylene ether) has an intrinsic viscosity of at least about 0.20 dL/g as measured in chloroform at 25° C.

38. The method of claim 1, further comprising recovering the complex metal catalyst with an aqueous solution.

39. A method of preparing a poly(arylene ether), comprising:

oxidatively coupling a monohydric phenol using an oxygen-containing gas in the presence of a solvent and a complex metal catalyst to produce a poly(arylene ether) resin;

removing a portion of the solvent to produce a concentrated solution having a cloud point, $T_{cloud}$; and combining the concentrated solution with an anti-solvent to precipitate the poly(arylene ether);

wherein a temperature of at least about ($T_{cloud}$–10° C.) is maintained in the poly(arylene ether)-containing solution from the beginning of the concentration step to the moment immediately before the concentrated solution is combined with anti-solvent.

40. A method of preparing a poly(arylene ether), comprising:

oxidatively coupling 2,6-dimethylphenol and 2,3,6-trimethylphenol using an oxygen-containing gas in the presence of toluene and a complex copper catalyst to produce a poly(arylene ether) copolymer resin;

removing a portion of the solvent to produce a concentrated solution having a cloud point, $T_{cloud}$; and adjusting the temperature of the concentrated solution to a temperature, T, satisfying the inequality $$T > \left( \frac{\phi_s - (0.296 \times IV + 1.27 \times TMP - 35.7)}{1.97(1 - 0.00795 \times IV - 0.0249 \times TMP)} - 10 \right)$$

where $\phi_S$ is the polymer concentration (expressed in weight percent), IV is the intrinsic viscosity of the copolymer in chloroform at 25° C. (expressed in mL/g), and TMP is the 2,3,6-trimethylphenol content of the copolymer (expressed in weight %); and combining the concentrated solution with an anti-solvent to precipitate the poly(arylene ether).

41. A method of preparing a poly(arylene ether), comprising:

oxidatively coupling 2,6-dimethylphenol and 2,3,6-trimethylphenol using an oxygen-containing gas in the presence of toluene and a complex copper catalyst to produce a poly(arylene ether) copolymer resin; wherein the weight ratio of 2,6-dimethylphenol to 2,3,6-trimethylphenol is about 3:1 to about 6:1;

recovering the complex metal catalyst with an aqueous solution;

removing a portion of the solvent to produce a concentrated solution comprising about 30 to about 45 weight percent of the poly(arylene ether) copolymer resin and having a cloud point, $T_{cloud}$;

adjusting the temperature of the concentrated solution to at least about ($T_{cloud}$+10° C.); and combining the concentrated solution with an anti-solvent to precipitate the poly(arylene ether);

wherein the precipitated poly(arylene ether) has an intrinsic viscosity of about 0.25 to about 0.50 dL/g; and wherein the precipitated poly(arylene ether) comprises up to about 15 weight percent of particles smaller than 38 micrometers.

42. A method of preparing a poly(arylene ether), comprising:

oxidatively coupling 2,6-dimethylphenol and 2,3,6-trimethylphenol using an oxygen-containing gas in the presence of toluene and a complex copper catalyst to produce a poly(arylene ether) copolymer resin; wherein the weight ratio of 2,6-dimethylphenol to 2,3,6-trimethylphenol is about 3:1 to about 6:1;

recovering the complex metal catalyst with an aqueous solution;

removing a portion of the solvent to produce a solution having about 30 to about 45 weight percent poly(arylene ether);

adjusting the temperature of the concentrated solution to at least about 80° C.; and combining the concentrated solution with an anti-solvent to precipitate the poly (arylene ether);

wherein the precipitated poly(arylene ether) has an intrinsic viscosity of about 0.25 to about 0.40 dL/g; and wherein the precipitated poly(arylene ether) comprises up to about 15 weight percent of particles smaller than 38 micrometers.

43. A poly(arylene ether) prepared by the method of claim 1 and comprising up to about 20 weight percent of particles smaller than 38 micrometers.

* * * * *